July 28, 1931.  R. R. McLAMARRAH  1,816,121
AUTOMOBILE TRAILER HITCH
Filed Aug. 29, 1930
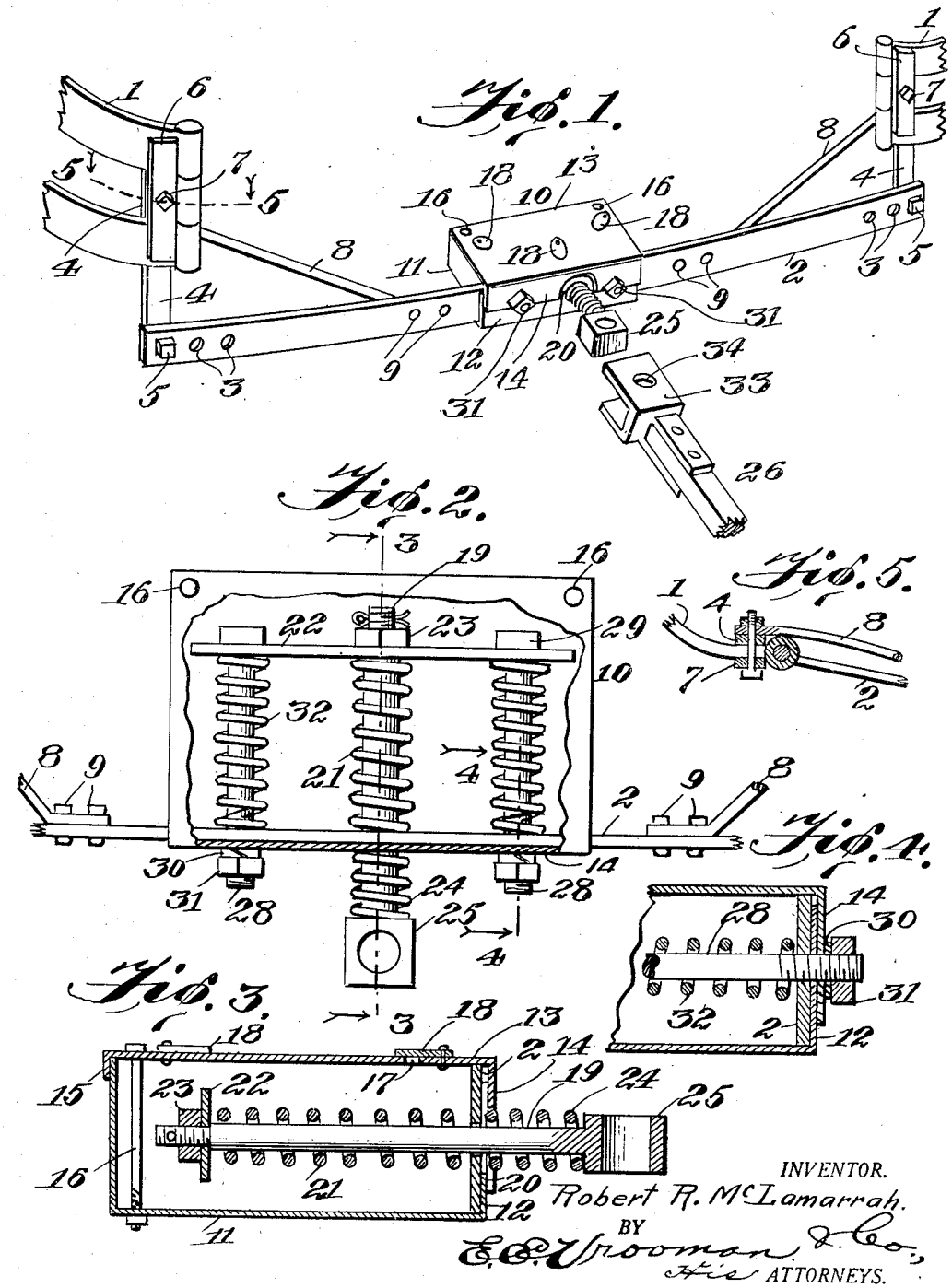

Patented July 28, 1931

1,816,121

UNITED STATES PATENT OFFICE

ROBERT R. McLAMARRAH, OF WOONSOCKET, SOUTH DAKOTA

AUTOMOBILE TRAILER HITCH

Application filed August 29, 1930. Serial No. 478,741.

This invention relates to an automobile trailer hitch.

An object of my invention is the provision of simple and efficient means for attaching a trailer to an automobile, whereby the "jerk" or jar is taken off the automobile in conveying the trailer synchronously with the same.

Another object of my invention is the construction of a trailer hitch which can be easily applied to different automobiles and whereby a trailer can be readily attached to an automobile or vehicle having my device attached thereto.

A still further object of the invention is the construction of a novel and efficient casing, and mounting the spring carrying bolts in the casing in a novel and efficient manner, all constituting essential units of my device.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Figure 1 is a perspective view of a device constructed in accordance with the present invention.

Figure 2 is a fragmentary top plan view of my device, showing part of the cover of the casing in section and partly broken away.

Figure 3 is a sectional view taken on line 3—3, Figure 2, and looking in the direction of the arrows.

Figure 4 is a sectional view taken on line 4—4, Figure 2, and looking in the direction of the arrows.

Figure 5 is a sectional view taken on line 5—5, Figure 1, and looking in the direction of the arrows.

Referring to the drawings by numerals 1, 1 designates a pair of bumpers of any common structure, to which my device is adjustably secured. The device comprises a primary, horizontal bar 2, which is provided near its end with horizontal longitudinally-aligned apertures 3. Vertical main bars 4 are at the ends of primary bar 2 and bolts 5 secure these bars 4 at any of the apertures 3, to accommodate bumpers 1; in some automobiles, the bumpers 1 are closer together than in others, so that I have provided means for adjustably securing the device to different types of bumpers. In the present instance, the bars 4 are placed behind the bumpers with a secondary vertical bar 6 in front of each bumper. A bolt 7 extends through the contiguous bars 4 and 6, securing the same together. A suitable brace 8 is at each end of bar 2, with its inner end fastened at 9 and its outer end on bolt 7 (Fig. 5).

The casing 10 comprises body 11 overlapping at 12 the front face of primary bar 2. A cover 13 is placed upon body 11 with a depending front flange 14 overlapping the front portion 12 of body 11 (Figs. 1 and 3). The cover 13 has a flange 15 formed on its outer edge (Fig. 3). Vertical bolts 16 pass through the cover 13 and through the body 11 (Fig. 3) securely fastening the cover upon the body. The cover is provided with lubricating apertures 17 (Fig. 3) covered by hinged caps 18.

A central sliding bolt 19 extends through bar 2 and through openings 20 formed in the overlapping portions 12 and 14 of the body 11 and cover 13, respectively. On the inside of the body 11 is coil spring 21, mounted on bolt 19 and bearing against bar 22, which bar is held on the bolt by nut 23. Mounted on bolt 19, outside of the casing, is coil spring 24. Bolt 19 has an apertured head 25, by means of which the trailer tongue 26 is attached to the device. Bolt 19 also has a cotter pin 27 extending through its inner end to positively lock nut 23 thereon. I employ a pair of stationary bolts 28. Each bolt 28 has a head 29 against which bar 22 bears, as said bar is mounted on bolt 28. Each bolt 28 is threaded through primary bar 2 and the overlapping portions 12 and 14 of the casing. A split washer 30 is mounted on each bolt 28 against the front flange 14 and nut 31 is threaded on the outer end of the bolt, against said washer 30, the washer serving to lock the nut on the bolt against accidental displacement. It will, therefore, be seen that the bolts 28 are anchored upon bar 2 and portions of casing 10.

On these bolts 28 are coil springs 32 against which bar 22 bears, so that when the sliding bolt 19 is drawn outwardly, springs 32 will be depressed, acting as bumpers to absorb the shock or strain, thereby preventing jarring of the automobile to which the trailer is attached. Of course, spring 21 also assists springs 32. Further spring 24 prevents too sudden return of bolt 19 to its innermost position within the casing 10. This spring 24 acts as an equalizer and prevents the parts from rattling or causing any undue noise.

It will be seen that I "built up" a casing around the primary bar 2 and have secured the casing to the bar by the bolts of the device.

The trailer tongue 26 is provided with a bifurcated coupler 33 which has registering apertures 34. These apertures 34 register with the aperture in head 25 and a suitable pin (not shown) can be placed in these registering apertures for securing the parts together.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a device of the class described, the combination of a primary bar, a casing having a portion of its body overlapping said primary bar, a cover on said casing and having a portion overlapping that portion of the body overlapping the primary bar, and a spring carrying sliding bolt mounted upon said primary bar and partly within said casing and adapted to have a trailer tongue attached thereto.

2. In a device of the class described, the combination of a primary bar, a casing having said primary bar extending through the same, a cover on said casing and having a front flange extending down over said primary bar, said primary bar provided with an aperture within said casing, said casing and cover provided with bolt-receiving openings registering with said aperture of the primary bar, and a spring pressed trailer attaching bolt extending through said aperture and said opening.

3. In a device of the class described, the combination of a casing, a primary bar extending through the ends of said casing and positioned against the front of the casing, stationary bolts threaded through said primary bar and through portions of the side of said casing, split washers on the outer ends of said bolts against the side of said casing, nuts on the outer ends of said bolts and against said split washer, a sliding bolt between said stationary bolts and having its outer end extending beyond one side of said casing, a spring on said sliding bolt outside of said casing, springs on all of said bolts within said casing, and a common bar mounted on all of said bolts within the casing, and in engagement with said springs, whereby when said sliding bolt is moved outwardly, the bar on the bolts will slide upon said stationary bolts, substantially as shown and described.

4. In a device of the class described, the combination of a casing, a bar extending therethrough, stationary bolts screwed through said bar and casing, springs on said bolts, an attaching sliding bolt mounted upon said casing and bar, said sliding bolt provided with a spring, and a common bar mounted on all of said bolts and engaging said springs and adapted to slide upon said stationary bolts when outward movement is imparted to said attaching sliding bolt.

5. In a device of the class described, the combination of a casing, a cover having a front flange extending a considerable distance down one side of said casing, said side of the casing and said front flange constituting overlapping portions, a primary bar extending through said casing against said overlapping portions, stationary bolts screwed through said primary bar and through said overlapping portions for securing the same together, a central sliding bolt in said casing and extending through said primary bar and through openings in said overlapping portions, springs on all of said bolts, and a common bar on all of said bolts and engaged by said springs and spaced a distance from said primary bar.

In testimony whereof I hereunto affix my signature.

ROBERT R. McLAMARRAH.